US012639489B2

(12) United States Patent (10) Patent No.: US 12,639,489 B2
Bhatta et al. (45) Date of Patent: May 26, 2026

(54) CONTROLS SIMULATION INITIALIZATION

(71) Applicant: GM CRUISE HOLDINGS LLC, San Francisco, CA (US)

(72) Inventors: Pradeep Bhatta, Princeton, NJ (US); Rizwan Ehtesham Ahmed, Canton, MI (US); Brandon Morton, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 1080 days.

(21) Appl. No.: 17/710,680

(22) Filed: Mar. 31, 2022

(65) Prior Publication Data

US 2023/0315935 A1 Oct. 5, 2023

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .............................. G06F 30/20; G06F 2111/10
See application file for complete search history.

(56) References Cited

U.S. PATENT DOCUMENTS

| | | | |
|---|---|---|---|
| 2017/0109458 A1* | 4/2017 | Micks | .................... G06F 3/0484 |
| 2017/0270236 A1* | 9/2017 | Yamaura | ................. G06F 30/20 |
| 2022/0242401 A1* | 8/2022 | Thompson | ................ G06F 1/14 |

* cited by examiner

*Primary Examiner* — Chuen-Meei Gan
(74) *Attorney, Agent, or Firm* — CANTOR COLBURN LLP

(57) ABSTRACT

Architectures and techniques for initializing a simulation architecture are described. A platform model and an environment model are run on recorded data during a first period of time. The platform model and the environment model provide information to control modules. The platform model is run on a blended combination of recorded data and data from the set of control modules and the environment model is run on processed output data from the platform model during a second period of time. The platform model is run on data from the set of control modules and the environment model is run on output from the platform model from a previous period of time during a third period of time. Output signals from the platform model can be adjusted based on a subset of the recorded data during the first, second and/or third period of time.

18 Claims, 7 Drawing Sheets

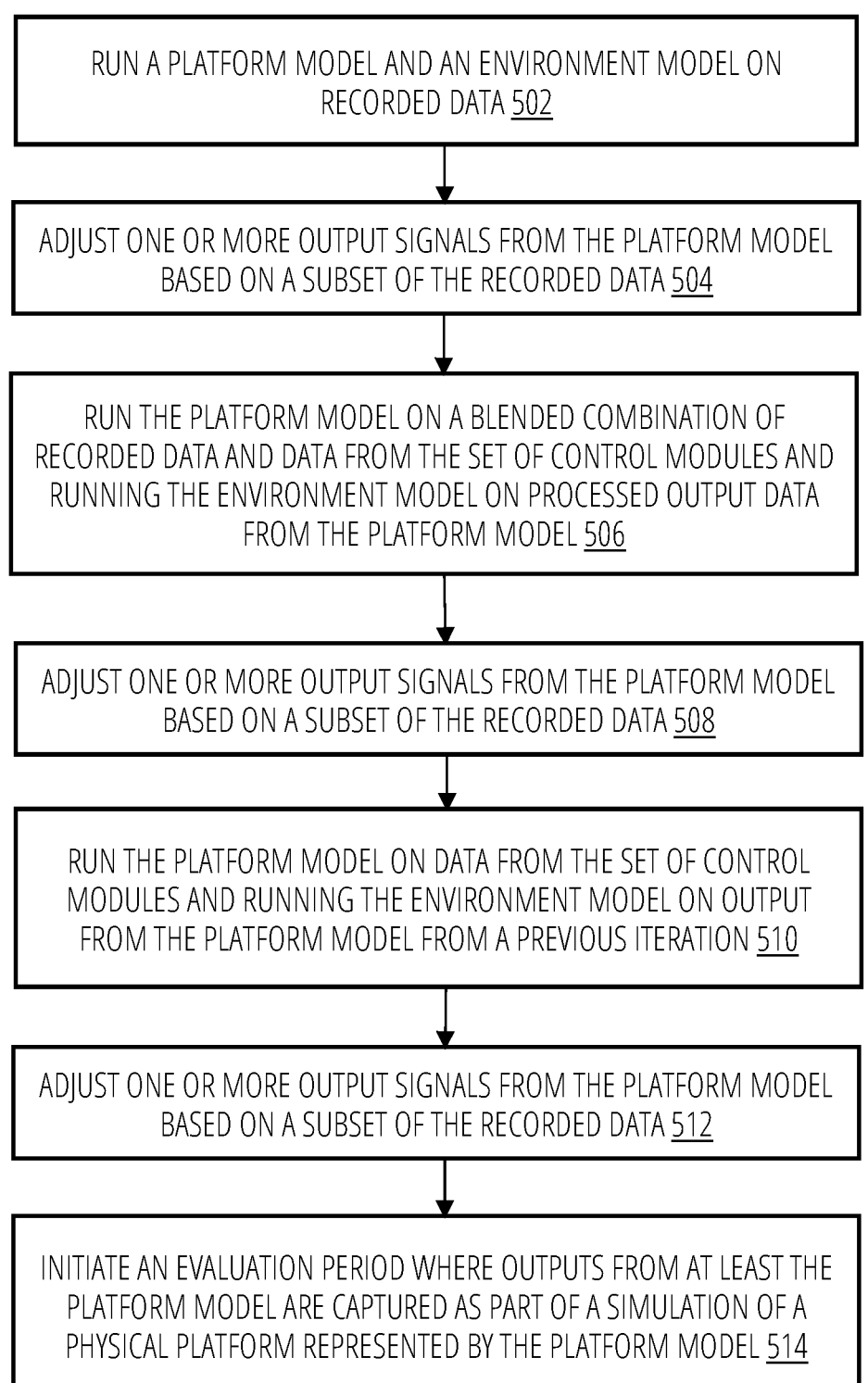

RUN A PLATFORM MODEL AND AN ENVIRONMENT MODEL ON RECORDED DATA 502

ADJUST ONE OR MORE OUTPUT SIGNALS FROM THE PLATFORM MODEL BASED ON A SUBSET OF THE RECORDED DATA 504

RUN THE PLATFORM MODEL ON A BLENDED COMBINATION OF RECORDED DATA AND DATA FROM THE SET OF CONTROL MODULES AND RUNNING THE ENVIRONMENT MODEL ON PROCESSED OUTPUT DATA FROM THE PLATFORM MODEL 506

ADJUST ONE OR MORE OUTPUT SIGNALS FROM THE PLATFORM MODEL BASED ON A SUBSET OF THE RECORDED DATA 508

RUN THE PLATFORM MODEL ON DATA FROM THE SET OF CONTROL MODULES AND RUNNING THE ENVIRONMENT MODEL ON OUTPUT FROM THE PLATFORM MODEL FROM A PREVIOUS ITERATION 510

ADJUST ONE OR MORE OUTPUT SIGNALS FROM THE PLATFORM MODEL BASED ON A SUBSET OF THE RECORDED DATA 512

INITIATE AN EVALUATION PERIOD WHERE OUTPUTS FROM AT LEAST THE PLATFORM MODEL ARE CAPTURED AS PART OF A SIMULATION OF A PHYSICAL PLATFORM REPRESENTED BY THE PLATFORM MODEL 514

FIG. 5

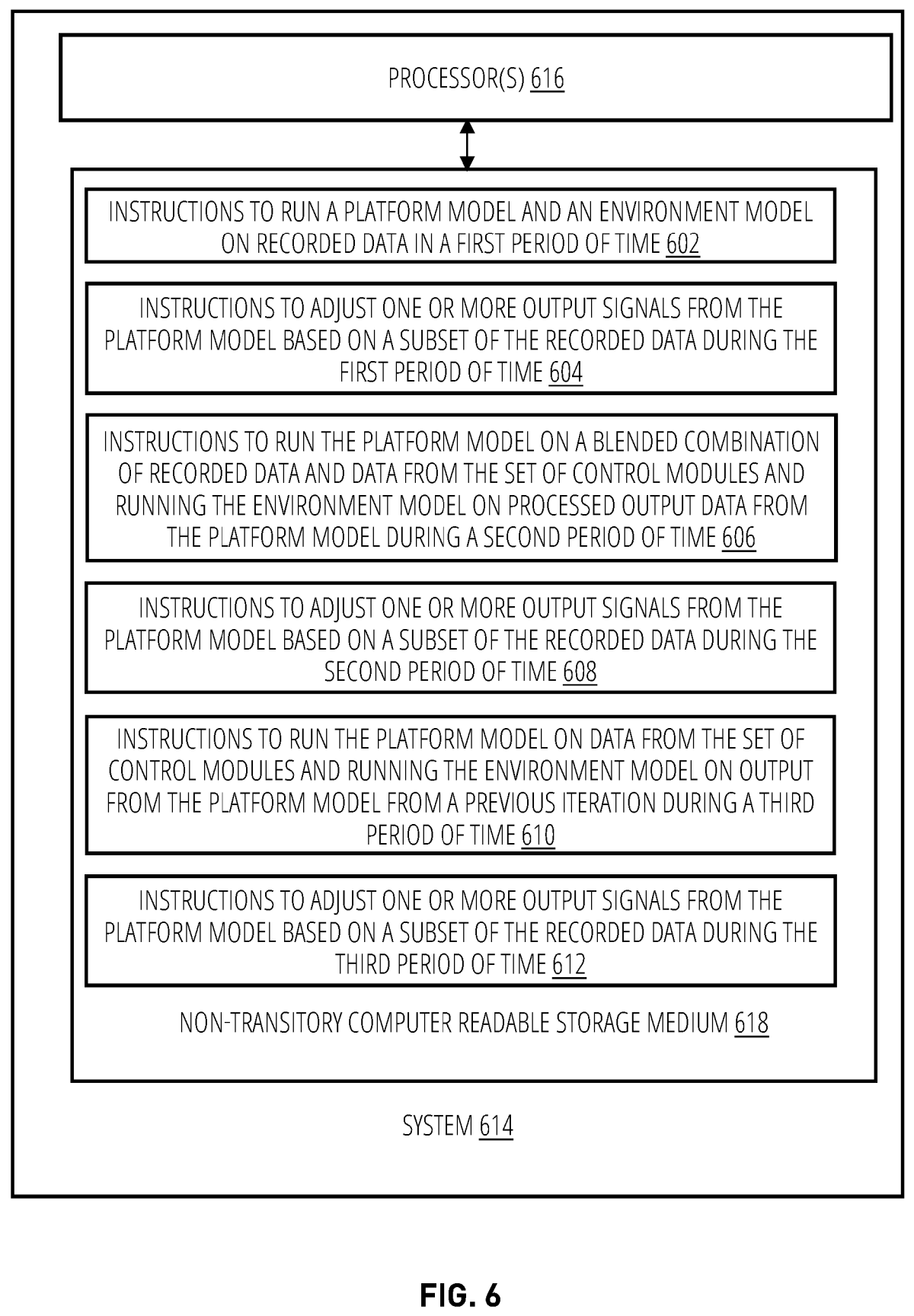

PROCESSOR(S) 616

INSTRUCTIONS TO RUN A PLATFORM MODEL AND AN ENVIRONMENT MODEL ON RECORDED DATA IN A FIRST PERIOD OF TIME 602

INSTRUCTIONS TO ADJUST ONE OR MORE OUTPUT SIGNALS FROM THE PLATFORM MODEL BASED ON A SUBSET OF THE RECORDED DATA DURING THE FIRST PERIOD OF TIME 604

INSTRUCTIONS TO RUN THE PLATFORM MODEL ON A BLENDED COMBINATION OF RECORDED DATA AND DATA FROM THE SET OF CONTROL MODULES AND RUNNING THE ENVIRONMENT MODEL ON PROCESSED OUTPUT DATA FROM THE PLATFORM MODEL DURING A SECOND PERIOD OF TIME 606

INSTRUCTIONS TO ADJUST ONE OR MORE OUTPUT SIGNALS FROM THE PLATFORM MODEL BASED ON A SUBSET OF THE RECORDED DATA DURING THE SECOND PERIOD OF TIME 608

INSTRUCTIONS TO RUN THE PLATFORM MODEL ON DATA FROM THE SET OF CONTROL MODULES AND RUNNING THE ENVIRONMENT MODEL ON OUTPUT FROM THE PLATFORM MODEL FROM A PREVIOUS ITERATION DURING A THIRD PERIOD OF TIME 610

INSTRUCTIONS TO ADJUST ONE OR MORE OUTPUT SIGNALS FROM THE PLATFORM MODEL BASED ON A SUBSET OF THE RECORDED DATA DURING THE THIRD PERIOD OF TIME 612

NON-TRANSITORY COMPUTER READABLE STORAGE MEDIUM 618

SYSTEM 614

FIG. 6

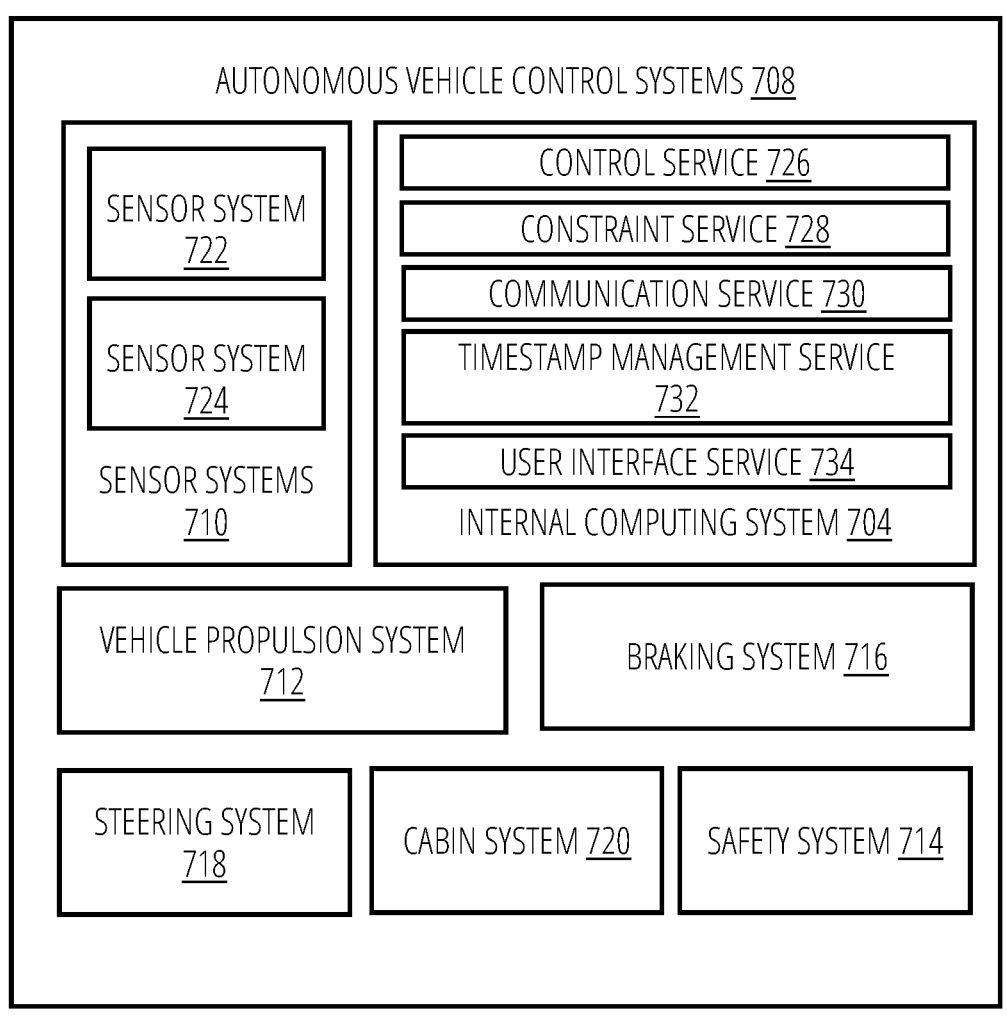
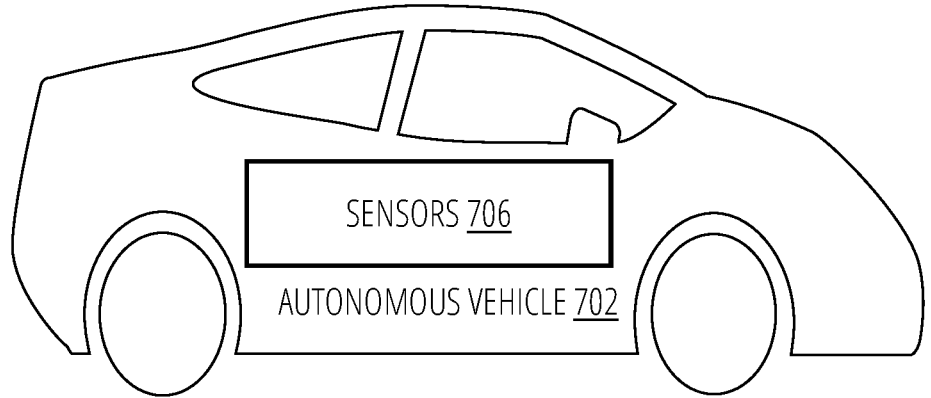
FIG. 7

CONTROLS SIMULATION INITIALIZATION

TECHNICAL FIELD

Examples relate to development of control mechanisms for autonomous vehicles. More particularly, examples relate to efficient initialization of simulation processes to be utilized for development of control mechanisms for autonomous vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous vehicle technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

The content of the drawings are illustrated by way of example, and not by way of limitation, in the figures of the accompanying drawings in which like reference numerals refer to similar elements.

FIG. 5 is a flow diagram for one technique for initiation of a simulation.

FIG. 6 is a block diagram of one example of a processing system that can provide control of initiation of a simulation.

FIG. 7 is a block diagram of an example autonomous vehicle, which may be simulated according to the approaches described herein.

DETAILED DESCRIPTION

Figure 1:
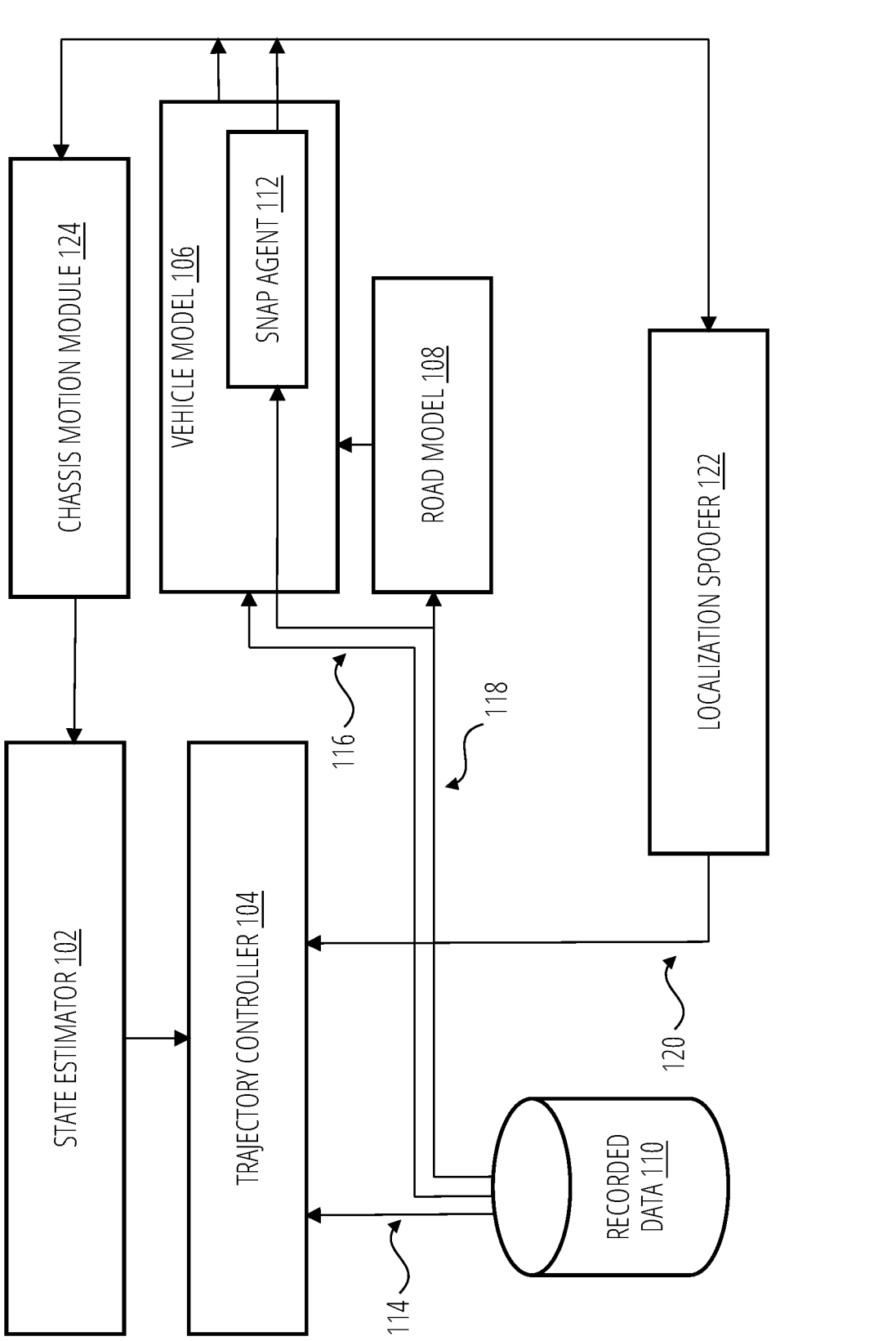
FIG. 1 is a conceptual diagram of one example of a first phase for a simulation initiation.

Various examples of simulation initialization are provided in terms of applications with respect to autonomous vehicles (AVs); however, the approaches described are more broadly applicable and can be utilized outside of AV environments. For example, simulations can be utilized as part of a development process for a human-operated vehicle having an advanced driver assistance system (ADAS) or a gaming system. One example AV configuration is provided in FIG. 7, which is described below.

As one AV example, the control simulation process can correspond to the control stack of an AV, vehicle dynamics models and/or road models. For accurate simulation results, it is useful to appropriately initialize the controls stack and vehicle dynamics states at the start of the evaluation period of the simulation. In the examples that follow, the evaluation period is the time interval when simulation outputs are expected to be an accurate representation of behavior of the AV by design (i.e., after the initiation process).

In general, the initiation process utilizes multiple phases, including: 1) a decoupled warmup of the controls stack and the vehicle dynamics models using inputs from previous real world data (e.g., inputs from previous AV trips), which can be performed with or without periodic position adjustments (also referred to as "snapping" below) based on the previous real world data; 2) blending of inputs to the models where outputs from the warmed up controls stack are gradually introduced into the vehicle dynamics models, which can be performed with or without periodic position adjustments based on the previous real world data; 3) settlement of blending transients where no blending is performed and periodic position adjustments based on the previous real world data are performed; and 4) final settlement where no blending and no position adjustments are performed. Various combinations of these phases can be utilized to provide an improved simulation initiation process. Examples and details regarding these phases and the overall initialization process are provided below. This multi-phase initiation process can last for a relatively short period of time (e.g., 5 seconds, 3 seconds, 10 seconds) before the evaluation process using the simulation begins.

In one example utilization, the simulation process described can be performed to settle the state of an AV control stack and the simulation vehicle model by blending the control commands from the simulation with previous real-world (e.g., on-road) data that has been collected to gradually bring the simulated AV to a desired state. The AV control stack manages information about the various functional components of the AV including, for example, state information, execution status, data management, etc.

In some examples, the position (or pose) of the AV during this initialization can be "snapped" to the previous real-world/on-road values to reduce drift prior to the evaluation portion of the simulation being initiated. Snapping generally refers to adjusting outputs from the platform model to be closer to recorded data for the corresponding conditions/situation. That is the pose of the AV can be adjusted (or "snapped") back to corresponding recorded data or the outputs can be adjusted to be within a pre-specified range of the corresponding values from the recorded data. Thus, snapping output signals can keep the output signals within an acceptable range of real world operation so that the following evaluation process can result in improved accuracy. Utilization of this approach with the multi-phase initialization process can result in an improved evaluation process as compared to less sophisticated approaches.

FIG. 1 is a conceptual diagram of one example of a first phase for a simulation initiation. The first phase, also called the warmup phase, lasts for a first period of time, $t_0$ to $t_1$, which can be, for example, 1.7 seconds. As other examples, the first phase can be 1.0 seconds, 0.75 seconds, 2.25 seconds, etc. The first phase generally consists of or otherwise comprises a decoupled warm up of state estimator 102 and trajectory controller 104, and warmup of vehicle model 106 and road model 108 using inputs from recorded data 110. The first phase can further include position adjustments (or snapping) to adjust positioning though snap agent 112.

In the example of FIG. 1, the initial state of vehicle model 106 can be set based on road controller commands 116 from recorded data 110. Vehicle model 106 can model one or more aspects of vehicle dynamics. Recorded data 110 provided for the initial state of vehicle model 106 can include, for example, an initial position and heading of the AV.

Recorded data 110 provided to vehicle model 106 can further include an initial velocity and/or any other recorded data 110 that can be utilized to initiate vehicle model 106.

In one example, recorded data 110 can provide initial actuator states (e.g., braking torques, motor torques, steering wheel angle) that can be used to seed inputs and outputs of the actuator models of vehicle model 106. Recorded data 110 values can also be used to set AV initial lateral and longitudinal accelerations. The number of states in vehicle model 106 that can be initialized using recorded data 110 can be dependent upon, for example, the sophistication of the underlying vehicle model(s) and the availability of corresponding data in recorded data 110. Additional and/or different data (e.g., steering wheel angular velocity) can also be supported.

Road model 108 can provide a model of the physical road to be simulated. Data to configure road model 108 (e.g., road estimated pose 118) can be provided from recorded data 110. In the first phase, input data for vehicle model 106 can be provided by recorded data 110 and road model 108. In one example, outputs from vehicle model 106 can be adjusted by snap agent 112 based on a subset of data (e.g., road estimated pose 118) from recorded data 110. Snap agent 112 can function to adjust outputs from vehicle model 106 based on recorded data 110 to minimize drift of the modeling performed by vehicle model 106 as compared to actual performance of the AV on the physical road, due in some cases to differences in actual road geometry and modeled road geometry via road model 108.

In an example, trajectory controller 104 can be initialized with initial positioning information and initial velocity information (e.g., from selected road path data 114 and estimated vehicle pose 120 from localization spoofer 122). Trajectory controller 104 can simulate controller commands and/or inputs to follow a selected trajectory. Trajectory controller 104 can function to control specific components of the host platform (e.g., an AV). Examples of various components and systems are provided below in, for example, FIG. 7. State estimator 102 can function to provide a simulated state for one or more controls corresponding to the host platform.

Output signals from snap agent 112 can be provided to chassis motion module 124 and to localization spoofer 122 to provide feedback (e.g., estimated vehicle pose 120) to trajectory controller 104. Chassis motion module 124 models motions (and possibly other characteristics) of a host AV chassis. Chassis motion module 124 can be, for example, a model of an inertial measurement unit (IMU). Localization spoofer 122 can simulate estimations of vehicle position, velocity, etc.

During the warmup phase, state estimator 102 and trajectory controller 104 can begin operation based on information from recorded data 110, chassis motion module 124 and localization spoofer 122. This warmup operation allows state estimator 102 and trajectory controller 104 to begin with an initial state (e.g., from recorded data 110) and perform initial simulation operations. This process can repeat during the first period of time (i.e., $t_0$ to $t_1$). During the warmup phase, state estimator 102 and trajectory controller 104 are decoupled from vehicle model 106 and road model 108 in that trajectory controller 104 does not provide inputs to vehicle model 106 and/or road model 108. The initiation process including the warmup phase can have a strong impact on the behavior of state estimator 102 and/or trajectory controller 104 during the simulation and evaluation process.

During the warmup phase, snap agent 112 can function to adjust selected outputs from vehicle model 106 (or "snap"

the outputs) back to the corresponding recorded data from recorded data 110. In one example, snap agent 112 can adjust the outputs to be within a pre-specified range of the corresponding values from recorded data 110. Thus, snap agent 112 can function to keep the initiation process within an acceptable range of real world operation so that the following evaluation process can result in improved accuracy.

In one example, snap agent 112 adjusts vehicle model 106 output planar position (i.e., x- and y-axis position) and heading to correspond to values derived from road estimated pose 118 at a pre-selected frequency. In one example, snap agent 112 can adjust outputs on each cycle of simulator operation. As another example, snap agent 112 can adjust outputs when road estimated pose 118 values are updated. In another example, snap agent 112 can adjust outputs at the end of the first phase of initiation.

Figure 2:
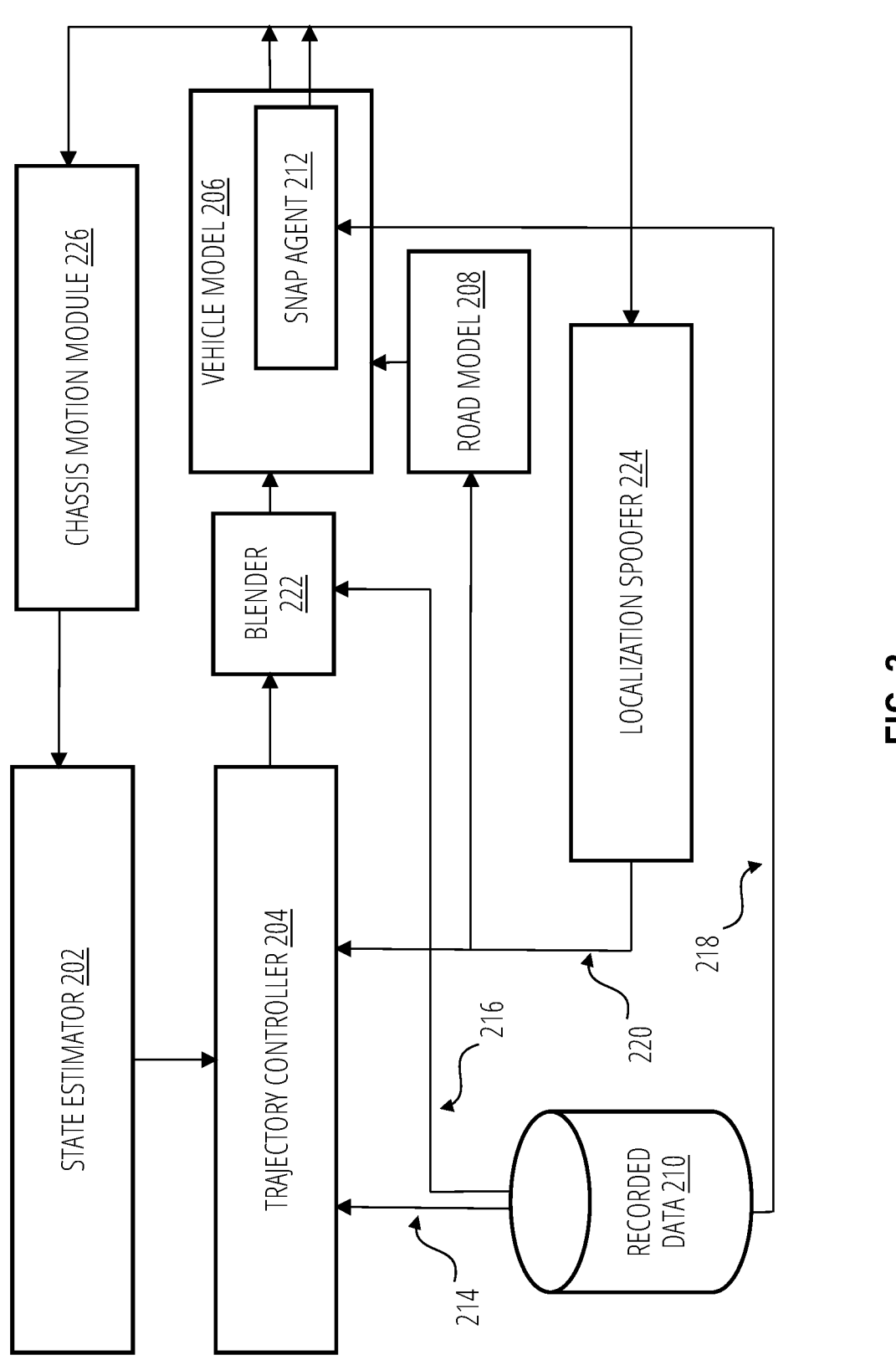
FIG. 2 is a conceptual diagram of one example of a second phase for a simulation initiation.

FIG. 2 is a conceptual diagram of one example of a second phase for a simulation initiation. The second phase, also called the blending phase, lasts for a second period of time, $t_1$ to $t_2$, during which the outputs of the warmed up controls stack is gradually introduced (i.e., blended) into the vehicle dynamics model inputs. The second phase can be, for example, 1.7 seconds. As other examples, the second phase can be 1.25 seconds, 1.9 seconds, 2.35 seconds. The second phase can also include position adjustments (or snapping).

In the example of FIG. 2, in the second phase vehicle model 206 can operate on input signals received from blender 222. Vehicle model 206 can operate as described above (e.g., vehicle model 106 in FIG. 1). In an AV example, during the second phase, one or more components modeled by vehicle model 206, for example, braking torque, motor torque and steering control command inputs (generally referred to by the variable x) to the vehicle dynamics models can be calculated as:

$$x(t) = \alpha(t)x_{real}(t) + (1-\alpha(t))x_{sim}(t),$$

where $x_{real}(t)$ represents real/recorded data and/or commands (e.g., road controller commands 216 from recorded data 210), $x_{sim}(t)$ represents data and/or commands from simulation sources), respectively, $$\alpha = \frac{t_2 - t}{t_2 - t_1} \text{ and } t$$

and t is the current elapsed time in the simulation. The blending functionality described can be applied to any number of inputs to vehicle model 206.

In the second phase, snap agent 212 can continue to operate as described above with respect to FIG. 1 by operating on output signals from vehicle model 206 and road estimated pose 218 from recorded data 210. In alternate examples, snap agent 212 can be inactive during the second phase. As another example, snap agent 212 can be active for one or more parts of the second phase and inactive for one or more other parts of the second phase. Thus, in the second phase vehicle model 206 receives blended inputs from blender 222 and input from road model 208 to perform the modeling functionality described above (e.g., ECUs, one or more actuators and/or other components of the AV). Road model 208 can operate as described above (e.g., road model 108 in FIG. 1). In one example, snap agent 212 can operate on the outputs of vehicle model 206 utilizing recorded data 210 to adjust the output signals to be more in line with recorded data 210.

Outputs from snap agent 212 can be provided to chassis motion module 226 and to localization spoofer 224, both of which operate to provide feedback signals to trajectory controller 204. In one example, chassis motion module 226 provides input signals to state estimator 202 and localization spoofer 224 provides input signals to trajectory controller 204. Chassis motion module 226 can operate as described above (e.g., chassis motion module 124 in FIG. 1). Trajectory controller 204 and state estimator 202 can operate as described above (e.g., state estimator 102 and trajectory controller 104 in FIG. 1) to provide input signals to trajectory controller 204, which provides updated signals to blender 222.

That is, trajectory controller 204 utilizes selected road path data 214 data from recorded data 210 and estimated vehicle pose 220 from localization spoofer 224 to generate controller commands for the host AV to follow. Localization spoofer 224 can operate as described above (e.g., localization spoofer 122 in FIG. 1). Similarly, state estimator 202 utilizes data from chassis motion module 226 regarding the simulated state of the AV chassis. Both state estimator 202 and trajectory controller 204 provide individual system/component control signals for systems and components within the host platform. This process can be repeated for the second period of time (i.e., $t_1$ to $t_2$).

Figure 3:
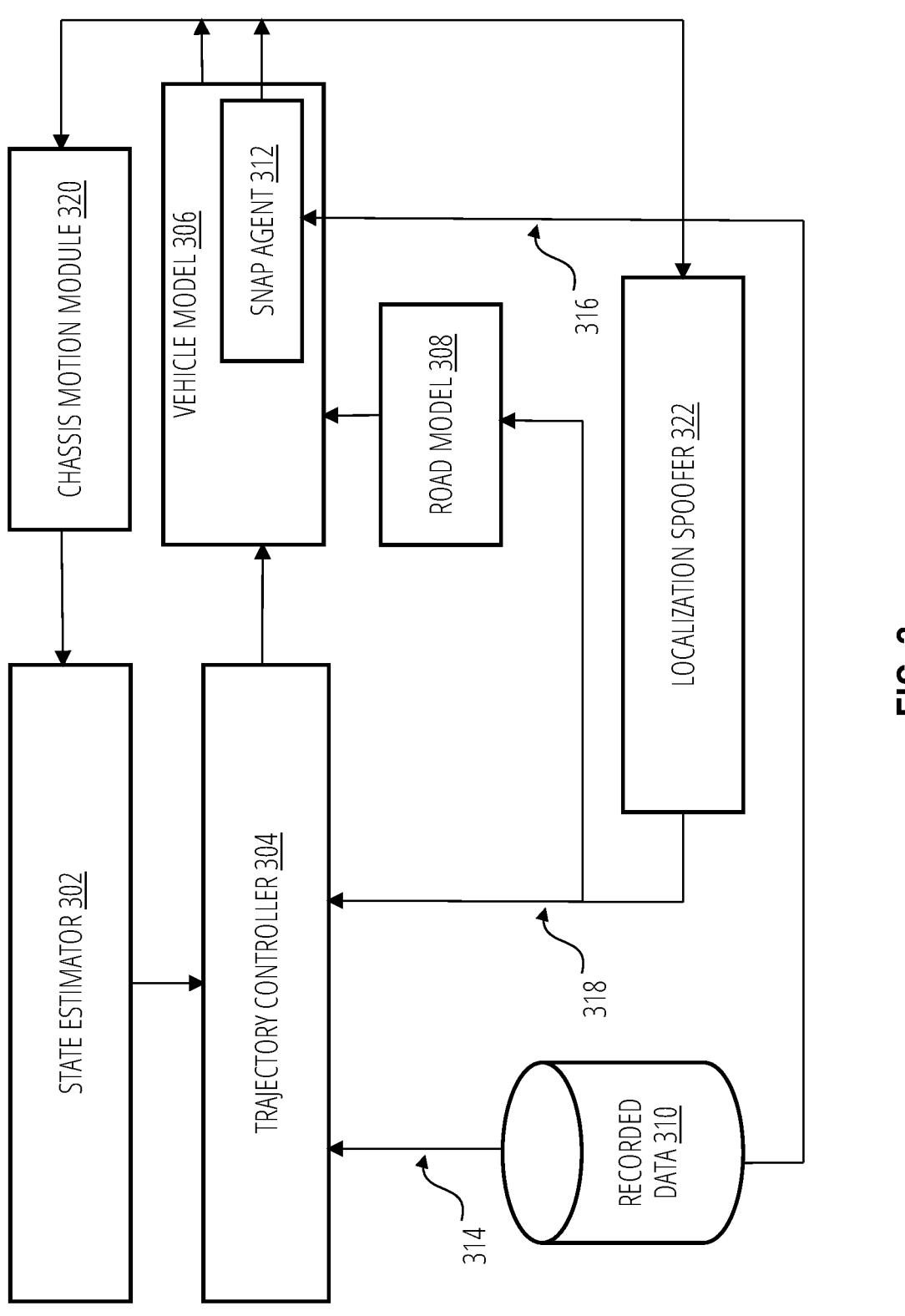
FIG. 3 is a conceptual diagram of one example of a third phase for a simulation initiation.

FIG. 3 is a conceptual diagram of one example of a third phase for a simulation initiation. The third phase, also called the settlement phase, lasts for a third period of time, $t_2$ to $t_3$, during which no blending is performed, but snapping can be performed. In one example, the third phase can be 1.9 seconds. In other examples, the third phase can be 2.5 seconds, 2.75 seconds, 3.25 seconds, etc.

During the first, second and third phases the state estimator and/or trajectory controller can generate outputs (e.g., steering wheel angle, throttle angle) that have oscillations that are not representative of real-world behavior. Conceptually, this can represent the AV attempting to close the gap between simulated behavior and desired behavior in which these attempts result in occasional overshooting, for example. As this third phase progresses these oscillations diminish and the simulated behavior more closely corresponds to the desired behavior.

In the third phase vehicle model 306 can operate on input signals received from trajectory controller 304 without blending (e.g., by blender 222 in FIG. 2). Vehicle model 306 and trajectory controller 304 can operate as described above (e.g., vehicle model 106 and trajectory controller 104, respectively, in FIG. 1). Thus, in the third phase there is no longer blending of data from trajectory controller 304 and recorded data 310. Instead, vehicle model 306 operates on data from trajectory controller 304 only. In the third phase, snap agent 312 can continue to provide adjustments to outputs from vehicle model 306 based on recorded data 310 (e.g., road estimated pose 316).

In the third phase, trajectory controller 304 receives input signals from chassis motion module 320, from localization spoofer 322 (e.g., estimated vehicle pose 318) and recorded data 310 (e.g., selected road path data 314). Chassis motion module 320 and localization spoofer 322 can operate as described above (e.g., chassis motion module 124 and localization spoofer 122, respectively, in FIG. 1). State estimator 302 and trajectory controller 304 operate as described above to provide input signals to vehicle model 306. Vehicle model 306 receives input signals from trajectory controller 304 and road model 308 to generate simulated operation of the host AV. Output signals from vehicle model 306 are provided to snap agent 312, which operates to adjust the output signals from vehicle model 306 based, at least in part, on recorded data 310 (e.g., road estimated pose 316). This process can be repeated for the third period of time (i.e., $t_2$ to $t_3$).

Figure 4:
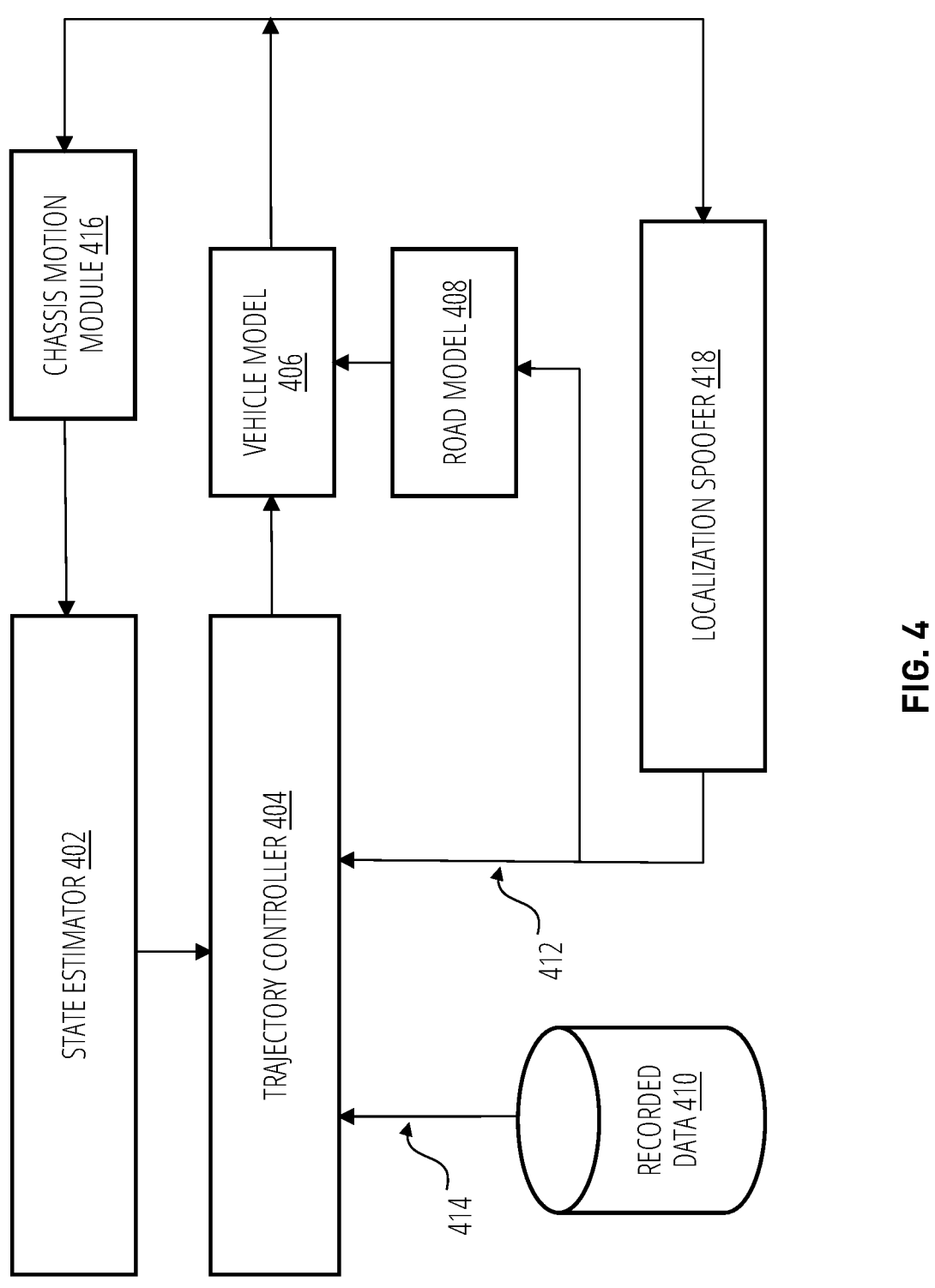
FIG. 4 is a conceptual diagram of one example of a fourth phase for a simulation initiation.

FIG. 4 is a conceptual diagram of one example of a fourth phase for a simulation initiation. The fourth phase can be an optional phase. That is, in some environments an evaluation/simulation phase can follow the third phase as described with respect to FIG. 3. In other environments, the fourth phase as described with respect to FIG. 4 can follow the third phase before evaluation/simulation.

The fourth phase, also called the finalization phase, lasts for a fourth period of time, $t_3$ to $t_4$, during which no blending and no snapping is performed. The fourth phase allows any remaining transients to settle prior to beginning the evaluation process. In one example, the fourth phase can be 2.0 seconds. In other examples, the fourth phase can be 2.5 seconds, 1.7 seconds, 3.0 seconds, etc. Thus, using an example initiation where the first phase is 0.75 seconds, the second phase is 0.75 seconds, the third phase is 3.0 seconds and the fourth phase is 0.5 seconds, the initialization starts 5.0 seconds before the simulation evaluation period.

In the example of FIG. 4, during the fourth phase neither blending nor snapping is performed. Thus, vehicle model 406 receives input signals from trajectory controller 404 without blending, and from road model 408. Vehicle model 406, trajectory controller 404 and road model 408 can operate as described above (e.g., vehicle model 106 trajectory controller 104 and road model 108, respectively, in FIG. 1). Output signals from vehicle model 406 are provided to chassis motion module 416 and to localization spoofer 418 without snapping. Chassis motion module 416 and localization spoofer 418 can operate as described above (e.g., chassis motion module 124 and localization spoofer 122, respectively, in FIG. 1). Both chassis motion module 416 and localization spoofer 418 can provide signals back to trajectory controller 404.

In one example, chassis motion module 416 provides input signals to state estimator 402 and localization spoofer 418 provides input signals (e.g., estimated vehicle pose 412) to trajectory controller 404. Trajectory controller 404 can also receive recorded data 410 (e.g., selected road path data 414). This process can be repeated for the fourth period of time (i.e., $t_3$ to $t_4$).

FIG. 5 is a flow diagram for one technique for initiation of a simulation. The initiation techniques described with respect to FIG. 5 can be performed by, for example, the systems and architectures illustrated in FIG. 1, FIG. 2, FIG. 3, FIG. 4, FIG. 6 and FIG. 7.

In block 502, a platform model (e.g., vehicle model 106, vehicle model 206, vehicle model 306, vehicle model 406) and an environment model (e.g., road model 108, road model 208, road model 308, road model 408) are run utilizing recorded data (e.g., recorded data 110, recorded data 210, recorded data 310, recorded data 410). The first phase of initiation corresponding to block 502 can provide a warmup phase for the platform model and the environment model. The first phase of initiation (e.g., block 502) can also provide a warmup phase for one or more control modules. During the warmup phase, the control modules are decoupled from the platform model and the environment model.

In block 504, one or more output signals from the platform model can be adjusted based on recorded data. During the warmup phases (e.g., block 502 and block 504), outputs from the platform model can be adjusted (or "snapped") back to corresponding recorded data (e.g., recorded data 110, recorded data 210, recorded data 310, recorded data 410). In one example, the outputs can be adjusted to be within a pre-specified range of the corresponding values from the recorded data. Thus, output signals during the warmup phases of the initiation process can be kept within an acceptable range of real world operation so that the following evaluation process can result in improved accuracy. In some examples, the functionality of block 504 can be optional.

In block 506, during a second phase the platform model can be run on a blended combination of recorded data and data from control modules provided by a blending mechanism (e.g., blender 222) and the environment model can be run on processed (e.g., by localization spoofer 122, localization spoofer 224, localization spoofer 322, localization spoofer 418) output data from previous iterations of the platform model. Example blending of inputs to the platform model can be calculated as: $x(t)=\alpha(t)x_{real}(t)+(1-\alpha(t))+x_{sim}(t)$, where $x_{real}(t)$ represents recorded data and $x_{sim}(t)$ represents data simulation sources, respectively, and $$\alpha = \frac{t_2 - t}{t_2 - t_1}.$$

The blending functionality described can be applied to any number of inputs to the platform model. Other blending equations can also be supported.

In block 508, one or more output signals from the platform model can be adjusted based on recorded data. During some warmup phases (e.g., block 506 and block 508), outputs from the platform model can be adjusted (or "snapped") back to corresponding recorded data. In one example, the outputs can be adjusted to be within a pre-specified range of the corresponding values from the recorded data. Thus, output signals during the initiation process can be kept within an acceptable range of real world operation. In some examples, the functionality of block 508 can be optional.

In block 510, during a third phase the platform model can be run on (non-blended) data from the control modules, and the environment model can be run on processed output data from previous iterations of the platform model. Thus, in the third phase there is no longer blending of data and the platform model operates on data from the control modules only.

In block 512, one or more output signals from the platform model can be adjusted based on recorded data. During the later phases (e.g., block 510 and block 512), outputs from the platform model can be adjusted (or "snapped") back to corresponding recorded data. In one example, the outputs can be adjusted to be within a pre-specified range of the corresponding values from the recorded data. Thus, output signals during the third phase of the initiation process can be kept within an acceptable range of real world operation so that the following evaluation process can result in improved accuracy. In some examples, the functionality of block 512 can be optional.

In block 514, an evaluation period can be initiated. In one example, prior to the evaluation period a fourth phase of the initiation process can be run where no blending and no snapping are performed for a relatively short period of time before the evaluation process is initiated. During the evaluation process outputs from the platform model are captured as part of a simulation of a physical platform (e.g., real world AV) represented by the platform model.

FIG. 6 is a block diagram of one example of a processing system that can provide control of initiation of a simulation. In one example, system 614 can be part of an autonomous vehicle (e.g., autonomous vehicle 702 as part of internal computing system 704) that utilizes various sensors including radar sensors. In other examples, system 614 can be part of a human-operated vehicle having an advanced driver assistance system (ADAS) that can utilize various sensors including radar sensors. In still other examples, system 614 may be a computing platform independent and separate from an AV computing platform (e.g., a desktop computer system and/or a cloud service platform).

In an example, system 614 can include processor(s) 616 and non-transitory computer readable storage medium 618. Non-transitory computer readable storage medium 618 may store instructions 602, 604, 606, 608, 610 and 612 that, when executed by processor(s) 616, cause processor(s) 616 to perform various functions. Examples of processor(s) 616 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 618 include tangible media such as random access memory (RAM), read-only memory (ROM), electrically erasable programmable read-only memory (EEPROM), flash memory, a hard disk drive, etc.

Instructions 602 cause processor(s) 616 to run a platform model (e.g., vehicle model 106, vehicle model 206, vehicle model 306, vehicle model 406) and an environment model (e.g., road model 108, road model 208, road model 308, road model 408) utilizing recorded data (e.g., recorded data 110, recorded data 210, recorded data 310, recorded data 410). The first phase of the initiation can provide a warmup phase for the platform model and the environment model. The first phase of initiation can also provide a warmup phase for one or more control modules. During the warmup phase, the control modules are decoupled from the platform model and the environment model.

Instructions 604 cause processor(s) 616 to adjust one or more output signals from the platform model based on recorded data. During the warmup phase, outputs from the platform model can be adjusted (or "snapped") back to corresponding recorded data (e.g., recorded data 110, recorded data 210, recorded data 310, recorded data 410). In one example, the outputs can be adjusted to be within a pre-specified range of the corresponding values from the recorded data. Thus, output signals during the first phase of the initiation process can be kept within an acceptable range of real world operation so that the following evaluation process can result in improved accuracy. In some examples, the snapping functionality during the first phase can be optional.

Instructions 606 cause processor(s) 616 to, during a second phase, run the platform model on a blended combination of recorded data and data from control modules, and run the environment model on processed (e.g., by localization spoofer 122, localization spoofer 224, localization spoofer 322, localization spoofer 418) output data from previous iterations of the platform model. Example blending of inputs to the platform model can be calculated as: $x(t)=\alpha(t)x_{real}(t)+(1-\alpha(t))+x_{sim}(t)$, where represents recorded data and $x_{sim}(t)$ represents data simulation sources, respectively, and $$\alpha = \frac{t_2 - t}{t_2 - t_1}.$$

The blending functionality described can be applied to any number of inputs to the platform model. Other blending equations can also be supported.

Instructions 608 cause processor(s) 616 to adjust one or more output signals from the platform model based on recorded data. During the warmup phases, outputs from the platform model can be adjusted (or "snapped") back to corresponding recorded data. In one example, the outputs can be adjusted to be within a pre-specified range of the corresponding values from the recorded data. Thus, output signals during the initiation process can be kept within an acceptable range of real world operation. In some examples, the snapping functionality during the second phase can be optional.

Instructions 610 cause processor(s) 616 to, during later phases, run the platform model on (non-blended) data from the control modules, and run the environment model on processed output data from previous iterations of the platform model. Thus, in the third phase there is no longer blending of data and the platform model operates on data from the control modules only.

Instructions 612 cause processor(s) 616 to adjust one or more output signals from the platform model based on recorded data. During the third phase, outputs from the platform model can be adjusted (or "snapped") back to corresponding recorded data. In one example, the outputs can be adjusted to be within a pre-specified range of the corresponding values from the recorded data. Thus, output signals during the third phase of the initiation process can be kept within an acceptable range of real world operation. In some examples, the snapping functionality during the third phase can be optional.

After completion of the three initiation phases, an evaluation period can be initiated. In one example, prior to the evaluation period a fourth phase of the initiation process can be run where no blending and no snapping are performed for a relatively short period of time before the evaluation process is initiated. During the evaluation process outputs from the platform model are captured as part of a simulation of a physical platform (e.g., real world AV) represented by the platform model.

FIG. 7 is a block diagram of an example autonomous vehicle, which may be simulated according to the approaches described herein. Autonomous vehicle 702 has the functionality to navigate roads without a human driver by utilizing sensors 706 and autonomous vehicle control systems 708. The simulation processes and architectures described above in FIG. 1 through FIG. 6 can be utilized to manage or update one or more components of autonomous vehicle 702 in simulation (e.g., simulation of sensor systems 710, vehicle propulsion system 712, safety system 714). Data captured by one or more components of autonomous vehicle 702 (e.g., internal computing system 704, sensor systems 710, vehicle propulsion system 712, braking system 716, steering system 718, cabin system 720, safety system 714) can provide recorded data (e.g., recorded data 110, recorded data 210, recorded data 310, recorded data 410) to be utilized in the simulation initiation process described.

Autonomous vehicle 702 can include, for example, sensor systems 710 including any number of sensor systems (e.g., sensor system 722, sensor system 724). Sensor systems 710 can include various types of sensors that can be arranged throughout autonomous vehicle 702. For example, sensor system 722 can be a camera sensor system. As another example, sensor system 724 can be a light detection and ranging (LIDAR) sensor system. As a further example, one of sensor systems 710 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 702 can further include mechanical systems to control and manage motion of autonomous vehicle 702. For example, the mechanical systems can include vehicle propulsion system 712, braking system 716, steering system 718, cabin system 720 and safety system 714. Vehicle propulsion system 712 can include, for example, an electric motor, an internal combustion engine, or both. Braking system 716 can include an engine brake, brake pads, actuators and/or other components to control deceleration of autonomous vehicle 702. Steering system 718 can include components that control the direction of the motion of autonomous vehicle 702. Cabin system 720 can include, for example, cabin temperature control systems, in-cabin infotainment systems and other internal elements.

Safety system 714 can include various lights, signal indicators, airbags and systems that detect and react to other vehicles. Safety system 714 can include one or more radar systems. Automobiles can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems typically operate in the 77 GHz band (e.g., 76-81 GHz). SRR systems can be used, for example, for blind spot detection or collision avoidance. SRR systems typically operate in the 24 GHz band. MRR systems can operate in either the 24 GHz band or the 77 GHz band. Other frequency bands can also be supported.

Autonomous vehicle 702 can further include internal computing system 704 that can interact with sensor systems 710 as well as the mechanical systems (e.g., vehicle propulsion system 712, braking system 716, steering system 718, cabin system 720, safety system 714). Internal computing system 704 includes at least one processor and at least one memory system that can store executable instructions to be executed by the processor. Internal computing system 704 can include any number of computing sub-systems that can function to control autonomous vehicle 702. Internal computing system 704 can receive inputs from passengers and/or human drivers within autonomous vehicle 702.

Internal computing system 704 can include control service 726, which functions to control operation of autonomous vehicle 702 via, for example, the mechanical systems as well as interacting with sensor systems 710. Control service 726 can interact with other systems (e.g., constraint service 728, communication service 730, timestamp management service 732, internal computing system 704) to control operation of autonomous vehicle 702.

Internal computing system 704 can also include constraint service 728, which functions to control operation of autonomous vehicle 702 through application of rule-based restrictions or other constraints on operation of autonomous vehicle 702. Constraint service 728 can interact with other systems (e.g., control service 726, communication service 730, timestamp management service 732, user interface service 734) to control operation of autonomous vehicle 702.

Internal computing system 704 can further include communication service 730, which functions to control transmission of signals from, and receipt of signals by, autonomous vehicle 702. Communication service 730 can interact with other systems (e.g., control service 726, constraint service 728, timestamp management service 732, user interface service 734) to control operation of autonomous vehicle 702.

Internal computing system 704 can also include timestamp management service 732, which functions to provide and/or utilize timestamp information on communications to help manage and coordinate time-sensitive operations within internal computing system 704 and autonomous vehicle 702. Thus, timestamp management service 732 can interact with other systems (e.g., control service 726, constraint service 728, communication service 730, user interface service 734) to control operation of autonomous vehicle 702.

Internal computing system 704 can further include user interface service 734, which functions to provide information to, and receive inputs from, human passengers within autonomous vehicle 702. This can include, for example, receiving a desired destination for one or more passengers and providing status and timing information with respect to arrival at the desired destination. User interface service 734 can interact with other systems (e.g., control service 726, constraint service 728, communication service 730, timestamp management service 732) to control operation of autonomous vehicle 702.

Internal computing system 704 can function to send and receive signals from autonomous vehicle 702 regarding reporting data for training and evaluating machine learning algorithms, requesting assistance from a remote computing system or a human operator, software updates, rideshare information (e.g., pickup, dropoff), etc.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EE-PROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 618 has stored thereon data representing sequences of instructions that, when executed by a processor(s) 616, cause the processor(s) 616 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A non-transitory computer readable medium having stored thereon instructions that, when executed by one or more processors, cause the one or more processors to initialize in a memory a vehicle simulation architecture:

define a first period of time between $t_0$ and $t_1$, and during the first period of time run a platform model on recorded data and data generated by a road model running on the recorded data, wherein the platform model generates initial platform output data;

adjust, during the first period of time, the initial platform output data to minimize drift of the platform model from a real-world vehicle based on a subset of the recorded data and provide the adjusted initial platform output data to a set of control modules;

define a second period of time period between $t_1$ and $t_2$, and during the second period of time run the platform model on a blended combination of recorded data and data from the set of control modules, and run the road model on the adjusted platform output data from the platform model from the first period of time, the blended combination of recorded data and data from the set of control modules being determined according to $x(t)=\alpha(t)x_{real}(t)+(1-\alpha(t))+x_{sim}(t)$, where t is the current elapsed time in the simulation, $x_{real}(t)$ represents recorded data and $x_{sim}(t)$ represents data from previous iterations of the platform model, and $$\alpha = \frac{t_2 - t}{t_2 - t_1},$$

wherein the platform model provides blended platform output data to the set of control modules;

define a third period of time period between $t_2$ and $t_3$, and during the third period of time run the platform model on data from the set of control modules, and run the road model on adjusted output data from the platform model from a previous period of time, wherein the platform model provides unblended output data during the third period of time within a range of the real-world vehicle; and initiate an evaluation period subsequent to completion of the third period of time, wherein during the evaluation period outputs from at least the platform model are captured as part of a simulation of a physical platform represented by the platform model.

2. The non-transitory computer readable medium of claim 1, wherein the platform model comprises an autonomous vehicle (AV) model.

3. The non-transitory computer readable medium of claim 2, wherein the recorded data comprises data captured during operation of a real-world AV corresponding to the AV model in a real-world driving environment corresponding to the road model.

4. The non-transitory computer readable medium of claim 1, wherein the platform model comprises a human-operated vehicle model having an advanced driver assistance system.

5. The non-transitory computer readable medium of claim 4, wherein the recorded data comprises data captured during real-world operation of a human operated vehicle corresponding to the human-operated vehicle model in a real-world driving environment corresponding to the road model.

6. The non-transitory computer readable medium of claim 1, further comprising instructions that, when executed by the one or more processors, cause the one or more processors to adjust, during the second period of time, the blended platform output data to minimize drift of the platform model from a real-world vehicle based on a subset of the recorded data and provide the adjusted blended platform output data to the set of control modules.

7. The non-transitory computer readable medium of claim 1, further comprising instructions that, when executed by the one or more processors, cause the one or more processors to adjust, during the third period of time, the unblended platform output data to minimize drift of the platform model from a real-world vehicle based on a subset of the recorded data and provide the adjusted unblended platform output data to the set of control modules.

8. A simulation system comprising:

a memory system to store instructions and data;

one or more hardware processors coupled with the memory system to execute instructions and operate on data, the one or more hardware processors to:

define a first period of time between $t_0$ and $t_1$, and during the first period of time run a platform model on recorded data and data generated by a road model running on the recorded data, wherein the platform model generates initial platform output data;

adjust, during the first period of time, the initial platform output data to minimize drift of the platform model from a real-world vehicle based on a subset of the recorded data and provide the adjusted initial platform output data to a set of control modules;

define a second period of time period between $t_1$ and $t_2$, and during the second period of time run the platform model on a blended combination of recorded data and data from the set of control modules, and run the road model on the adjusted initial platform output data from the platform model from the first period of time, the blended combination of recorded data and data from the set of control modules being determined according to $x(t)=\alpha(t)x_{real}(t)+(1-\alpha(t))+x_{sim}(t)$, where t is the current elapsed time in the simulation, $x_{real}(t)$ represents recorded data and $x_{sim}(t)$ represents data from previous iterations of the platform model, and $$\alpha = \frac{t_2 - t}{t_2 - t_1},$$

wherein the platform model provides blended platform output data to the set of control modules;

adjust, during the second period of time, the blended platform output data to minimize drift of the platform model from the real-world vehicle based on the subset of the recorded data and provide the adjusted blended platform output data to the set of control modules;

define a third period of time period between $t_2$ and $t_3$, and during the third period of time run the platform model on data from the set of control modules, and run the road model on adjusted output data from the platform model from a previous period of time, wherein the platform model provides unblended platform output data to the set of control modules;

adjust, during the third period of time, the unblended platform output data based on the subset of the recorded data such that the unblended platform output data is within a range of the real-world vehicle, and provide the adjusted unblended platform output data to the set of control modules; and initiate an evaluation period subsequent to completion of the third period of time, wherein during the evaluation period outputs from at least the platform model are captured as part of a simulation of a physical platform represented by the platform model.

9. The system of claim 8, wherein the platform model comprises a human-operated vehicle model having an advanced driver assistance system.

10. The system of claim 8, wherein the platform model comprises an autonomous vehicle (AV) model.

11. The system of claim 10, wherein the recorded data comprises data captured during operation of a real-world AV corresponding to the AV model in a real-world driving environment corresponding to the road model.

12. The system of claim 9, wherein the recorded data comprises data captured during real-world operation of a human-operated vehicle corresponding to the human-operated vehicle model in a real-world driving environment corresponding to the road model.

13. A method for initializing a simulation architecture in a memory of a computer system, the simulation architecture comprising at least a platform model, a road model and a set of control modules configured to simulate a real-world vehicle operating in a real-world environment, the method comprising:

defining a first period of time between $t_0$ and $t_1$, and during the first period of time running the platform model on recorded data and data generated by a road model running on the recorded data, wherein the platform model and the environment model to provide generates initial platform output data;

adjusting, during the first period of time, the initial platform output data to minimize drift of the platform model from the real-world vehicle based on a subset of the recorded data and provide the adjusted initial platform output data to the set of control modules;

defining a second period of time period between $t_1$ and $t_2$, and during the second period of time running the platform model on a blended combination of recorded data and data from the set of control modules, and running the road model on the adjusted initial platform output data from the platform model from the first period of time, the blended combination of recorded data and data from the set of control modules being determined according to $x(t)=\alpha(t)x_{real}(t)+(1-\alpha(t))+x_{sim}(t)$, where t is the current elapsed time in the simulation, $x_{real}(t)$ represents recorded data and $x_{sim}(t)$ represents data from previous iterations of the platform model, and $$\alpha = \frac{t_2 - t}{t_2 - t_1},$$

wherein the platform model provides blended platform output data to the set of control modules;

defining a third period of time period between $t_2$ and $t_3$, and during the third period of time running the platform model on data from the set of control modules and running the road model on adjusted output data from the platform model from a previous period of time, and the platform model provides unblended platform output data to the set of control modules; and initiating an evaluation period subsequent to completion of the third period of time, wherein during the evaluation period outputs from at least the platform model are captured as part of a simulation of a physical platform represented by the platform model.

14. The method of claim 13, wherein the platform model comprises an autonomous vehicle (AV) model.

15. The method of claim 14, wherein the recorded data comprises data captured during operation of an AV corresponding to the AV model in a driving environment corresponding to the road model.

16. The method of claim 13, wherein the platform model comprises a model of a human-operated vehicle having an advanced driver assistance system, and the recorded data comprises captured data during operation of a human-operated vehicle corresponding to the model of the human-operated vehicle in a driving environment corresponding to the road model.

17. The method of claim 13, further comprising adjusting, during the second period of time, the blended platform output data to minimize drift of the platform model from the real-world vehicle based on a subset of the recorded data and provide the adjusted blended platform output data to the set of control modules.

18. The method of claim 13, further comprising adjusting, during the third period of time, the unblended platform output data to minimize drift of the platform model from the real-world vehicle based on a subset of the recorded data such that the unblended platform output data is within a range of the real-world vehicle, and provide the adjusted unblended platform output data to the set of control modules.

\*   \*   \*   \*   \*